(12) United States Patent  (10) Patent No.: US 9,327,340 B1
Bazerkanian et al.  (45) Date of Patent: May 3, 2016

(54) METHOD AND APPARATUS FOR CONSTRUCTING A FLOATING WHEEL CAP

(71) Applicants: Harry Bazerkanian, Covina, CA (US); Emil Kalovsky, Woodland Hills, CA (US); Oleg Kashper, Encino, CA (US)

(72) Inventors: Harry Bazerkanian, Covina, CA (US); Emil Kalovsky, Woodland Hills, CA (US); Oleg Kashper, Encino, CA (US)

(*) Notice: Subject to any disclaimer, the term of this patent is extended or adjusted under 35 U.S.C. 154(b) by 227 days.

(21) Appl. No.: 14/028,346

(22) Filed: Sep. 16, 2013

(51) Int. Cl.
*B60B 7/20* (2006.01)
*B21D 53/32* (2006.01)
*G09F 21/04* (2006.01)

(52) U.S. Cl.
CPC . *B21D 53/32* (2013.01); *B60B 7/20* (2013.01); *G09F 21/045* (2013.01)

(58) Field of Classification Search
CPC ...... B60B 7/0013; B60B 7/0053; B60B 7/20; G09F 21/04; G09F 21/045; Y10T 29/4954; Y10T 29/49542; B21D 53/32
See application file for complete search history.

(56) References Cited

U.S. PATENT DOCUMENTS

| | | |
|---|---|---|
| 710,195 A | 9/1902 | Jones |
| 2,014,058 A | 9/1935 | Tonai |
| 2,169,237 A | 8/1939 | Gasco |
| 2,869,262 A | 1/1959 | Lucas |
| 4,388,771 A | 6/1983 | Lalonde |
| 4,678,239 A | 7/1987 | Matsushita |
| 4,781,419 A * | 11/1988 | Boothe ................ B60B 7/00 301/108.3 |
| 5,190,354 A | 3/1993 | Levy et al. |
| 5,490,342 A | 2/1996 | Rutterman et al. |
| 5,588,715 A | 12/1996 | Harlen |
| 5,659,989 A | 8/1997 | Hsiao et al. |
| 5,957,542 A * | 9/1999 | Boothe ................ B60B 7/20 301/108.4 |
| 6,045,195 A | 4/2000 | Okamoto |
| 6,536,848 B1 | 3/2003 | Goodman |
| 6,554,370 B2 | 4/2003 | Fowlkes |
| 6,637,830 B1 | 10/2003 | Burgess |
| 7,036,891 B2 | 5/2006 | Chen |
| 7,121,631 B2 | 10/2006 | Strzelczyk |
| 7,204,561 B2 | 4/2007 | Iwasaki |
| 2,548,070 A1 | 4/2013 | Ryan |
| 2012/0193803 A1* | 8/2012 | Yoshino ................ H01L 23/36 257/773 |

* cited by examiner

*Primary Examiner* — David Bryant
*Assistant Examiner* — Jun Yoo
(74) *Attorney, Agent, or Firm* — Kenneth L. Green; Averill & Green

(57) ABSTRACT

A method for constructing a floating wheel cap using a modified original wheel cap. The original wheel cap is modified to provide a passage through the face of the original wheel cap and a positioning surface on the back of the original wheel cap. A fixed bearing retainer is fixedly attached to the back of the modified wheel cap using adhesive, and preferably using double sided tape. An offset weight floating cap is inserted through the passage in the modified wheel cap, through a bearing held in the fixed bearing retainer, and held in place by a ring. The offset weight floating cap is free to rotate in the modified wheel cap and includes an offset weight to urge the offset weight floating cap to a position displaying a design on the face of the offset weight floating cap in a desired position.

18 Claims, 4 Drawing Sheets

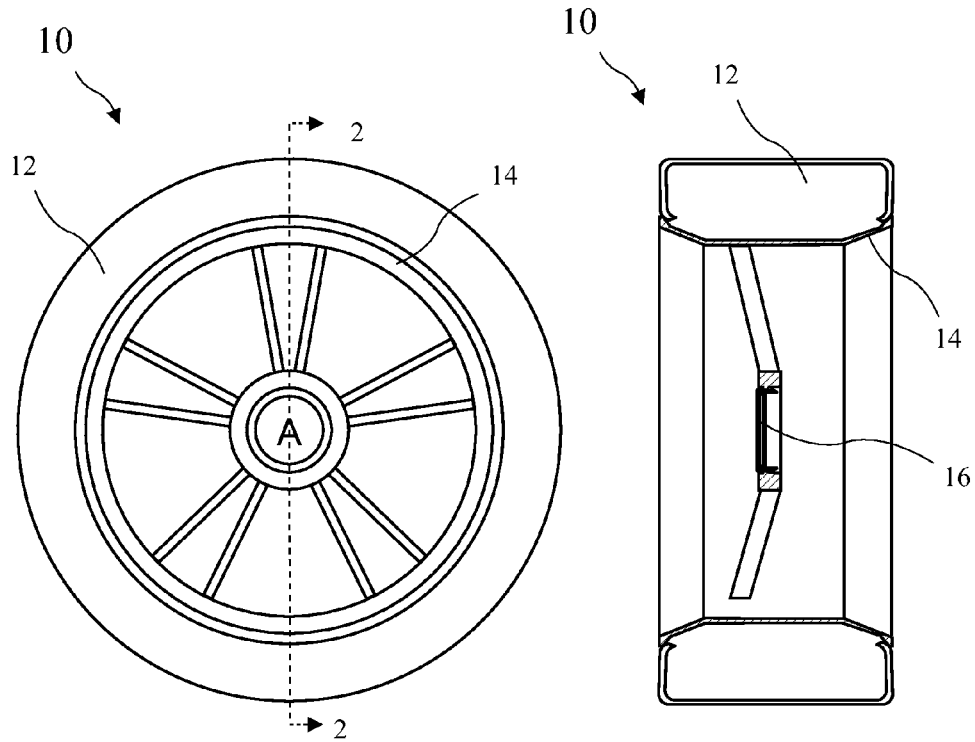
FIG. 1
(prior art)
FIG. 2
(prior art)
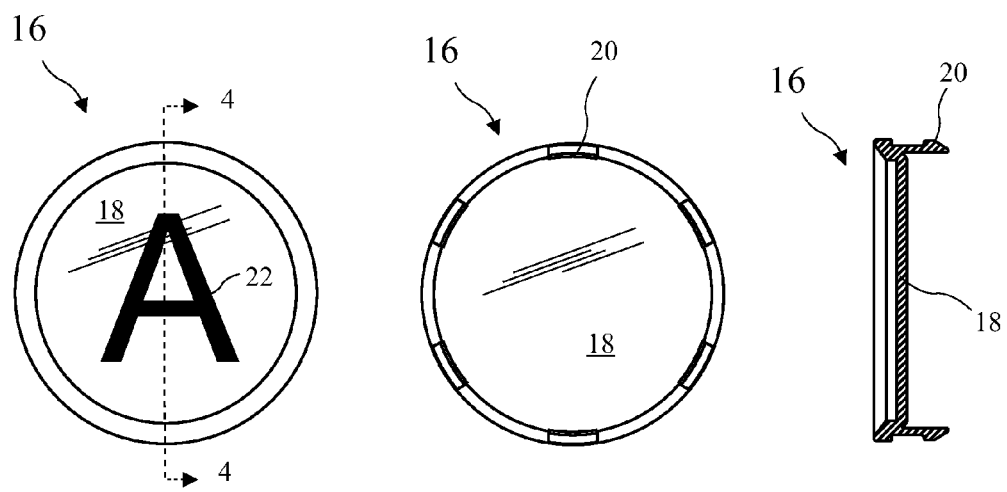
FIG. 3A
(prior art)
FIG. 3B
(prior art)
FIG. 4
(prior art)

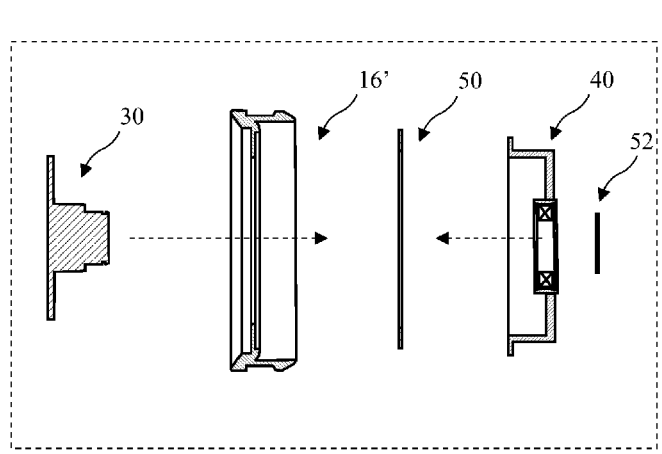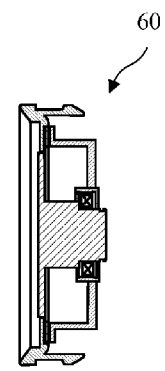
FIG. 11  FIG. 12
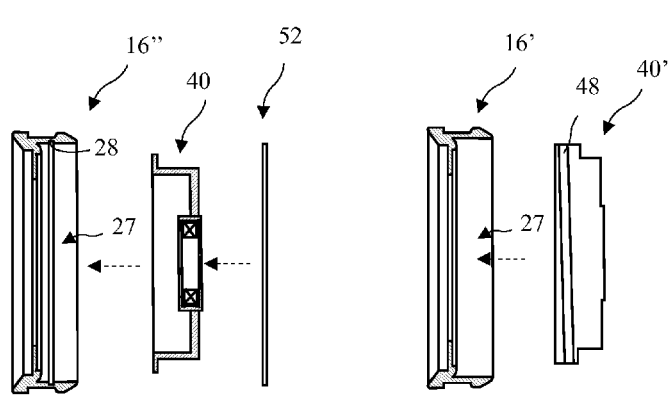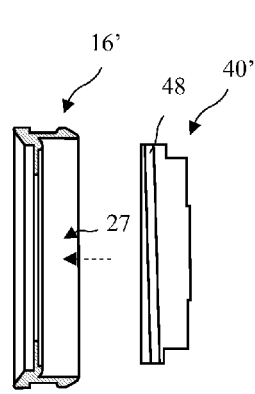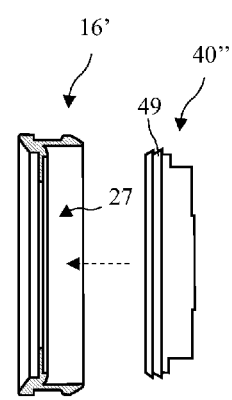
FIG. 13  FIG. 14  FIG. 15

METHOD AND APPARATUS FOR CONSTRUCTING A FLOATING WHEEL CAP

BACKGROUND OF THE INVENTION

The present invention relates to automotive wheel caps, and more particularly to a method for constructing a floating wheel cap by modifying a fixed wheel cap and attaching a fixed bearing retainer and attaching an offset weight floating cap to a bearing held by the fixed bearing retainer.

Jones, U.S. Pat. No. 710,195 describes an advertising display device adapted to be applied to vehicle-wheels and is supported on the wheel in such manner as to be stationary or non-rotative with respect to the vehicle, whereby the advertising matter displayed on the device will always be in position for proper display and inspection not withstanding the rotation of the wheel.

Tonai, U.S. Pat. No. 2,014,058 describes an invention that related to hub caps and its general object is to provide a hub cap primarily designed for the wheels of motor vehicles, that includes a name plate which is mounted so as to not rotate with the wheel and therefore remains substantially stationary, with the result it not only adds materially to the ornamentality of the wheel, but the name on the plate can be distinguished while the vehicle is in motion.

Gasco, U.S. Pat. No. 2,169,237 describes a stationary ornament for wheel hubcaps in such a manner that the ornament remains in a stationary position while the wheel is rotating by the vehicle traveling in a forward direction. In this type of construction the nameplate is mounted on the wheel or wheel hubcap by a free running or anti-friction bearing of some type.

Ryan, U.S. Pat. No. 2,548,070 describes an improved advertising display device adapted for use on motor vehicles. This invention is comprised of a sign carrying member having imprinted on one side thereof media or indicia, which said member is especially adapted for attachment to a non-rotatable axle of a motor vehicle in rotatably mounted on said axle. It provides an advertising display device for use on motor vehicle of various types, such as trucks, taxicabs, buses or the like.

Lucas, U.S. Pat. No. 2,869,262 describes improvements in wheel-supported advertising signs, and its principal object is to provide a convenient means for attaching an advertising sign to the hub cap of an automobile wheel in such a manner that the advertising sign is held against revolving movement while the wheel rotates, and which presents its advertising material in readable position at all times. This invention provides an anchoring means or adapter for the sign centrally of the hub cap and arranged in such a manner that it takes up little space for accommodation in relatively small tolerances between the cap and an axle extending into the same.

Matsushita, U.S. Pat. No. 4,678,239 describes a hub cap assembly having a non-rotating wheel cover consisting of a disc like body on which indicia, advertising material, trademarks and the like can be placed. The cover body is provided with a weight on its back surface acting to normally maintain the cover in a given orientation and is held on an outer bracket fitted with an annular bearing at its center and radially extending spokes through which the cover body is attached. An annular bearing is located within the annular center of the outer flange and is resiliently attached to the central boss portion of an inner bracket. The inner bracket being provided with a plurality of radial stays having a V-shaped clip at its end adapted to engage with the rim portion of the wheel.

Boothe, U.S. Pat. No. 4,781,4 describes a hub cap locking arrangement, in which, in a first embodiment, a hub cap having a cup-shaped configuration with a generally tubular portion insertable into the wheel hub opening, the tubular portion having a diameter slightly smaller than the diameter of the wheel hub opening of an alloy vehicle wheel. The hub cap may be formed from cast or machined metal or plastic material and is provided with a plurality of radially extending threaded apertures, through which extend pointed threaded members of high strength metal, the threaded members having either a hex head opening or a slotted end.

Levy et al., U.S. Pat. No. 5,190,354 describes a wheel cover for the wheel of a vehicle, comprising a securement and support device secured to the hub or to the rim of the wheel and a substantially flat shield element, mounted on the device for rotation and having an asymmetric spacing of its mass relative to its axis of rotation, permitting the shield element to maintain a fixed angular position relative to the horizontal, even during rotation of the wheel.

Rutterman et al., U.S. Pat. No. 5,490,342 describes a wheel cover for mounting on a wheel rim comprising a base member having a disc member rotatably mounted thereto to display an indicia thereon, the base member and disc member each includes stabilizing structure configured to mate with each other to maintain concentric alignment and restrict oscillation of the disc member relative to the base member and a counterweight attached to the disc member such that as the base member rotates with the wheel rim. The disc member does not rotate relative to the vehicle so that the indicia on the disc member can be viewed as the vehicle translates over the supporting surface.

Harlen, U.S. Pat. No. 5,588,715 describes a non-rotatable wheel cover assembly including a mounting assembly for mounting the wheel cover directly to a wheel-supporting member of a vehicle. The wheel cover has inner and outer surfaces and the wheel-supporting member is disposed for supporting wheels of the vehicle during rotation thereof. The mounting assembly includes a first attaching element mounted on the inner surface of the wheel cover and a wheel cover support assembly for secured relation of the first attaching element and the wheel supporting member. The wheel cover support assembly is disposed for non-rotational support of the first attaching element and the wheel cover during rotation of the wheel.

Boothe et. al, U.S. Pat. No. 5,957,542, disclosed a non-rotating wheel cover attached using a mounting base held inside a wheel by three radially extending screws. Access to the screws requires removing the wheel from the vehicle, thus providing an anti-theft feature. However, the non-rotating wheel cover of the '542 patent requires several machined parts and is somewhat expensive to manufacture, and is sized to individual wheels.

The prior art thus teaches a variety of weighted wheel covers for the purpose of fixed orientation during wheel rotation. However, the prior art does not teach a method for constructing an inexpensive floating cap suitable for various wheel sizes.

BRIEF SUMMARY OF THE INVENTION

The present invention addresses the above and other needs by providing a method for constructing a floating wheel cap using a modified original wheel cap. The original wheel cap is modified to provide a passage through the face of the original wheel cap and a positioning surface on the back of the original wheel cap. A fixed bearing retainer is fixedly attached to the back of the modified wheel cap using adhesive, and preferably using double sided tape. An offset weight floating cap is inserted through the passage in the modified wheel cap, through a bearing held in the fixed bearing retainer, and held in place by a ring. The offset weight floating cap is free to rotate in the modified wheel cap and includes an offset weight to urge the offset weight floating cap to a position displaying a design on the face of the offset weight floating cap in a desired position. The floating wheel cap is attached to a wheel using features present in the original wheel cap.

In accordance with one aspect of the invention, there is provided method including: cutting a centered opening in a wheel cap; cutting a recess in a back surface of the wheel cap; attaching a ring of double sided tape to an outer attaching ring of a fixed bearing retainer; aligning the outer attaching ring with the recess cut into the back surface of the wheel cap; attaching the outer attaching ring to the recess cut into the back surface of the wheel cap; inserting a shaft of an offset weight floating cap through the centered opening in the wheel cap; inserting the shaft of the offset weight floating cap through a bearing held by the fixed bearing retainer; attaching a fastener to the shaft of the offset weight floating cap to retain the shaft of the offset weight floating cap in the bearing to complete a floater cap assembly; and attaching the floater cap assembly to a wheel using original features of the wheel cap.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 is a front view of a prior art vehicle wheel and tire.

FIG. 2 is a cross-sectional view of a prior art vehicle wheel and tire taken along line 2-2 of FIG. 1.

FIG. 3A is a front view of a prior art wheel cap.

FIG. 3B is a rear view of the prior art wheel cap.

FIG. 4 is a cross-sectional view of the prior art wheel cap taken along line 4-4 of FIG. 3A.

FIG. 11 shows the elements of a floater cap assembly according to the present invention.

FIG. 12 shows an assembled floater cap assembly according to the present invention.

FIG. 13 shows a second embodiment using a ring to retain the fixed bearing retainer in a second modified wheel cap according to the present invention.

FIG. 14 shows threads on an outside surface of the fixed bearing retainer for threadably engaging the fixed bearing retainer in the modified wheel cap.

FIG. 15 shows barbs on an outside surface of the fixed bearing retainer for threadably engaging the fixed bearing retainer in the modified wheel cap.

Corresponding reference characters indicate corresponding components throughout the several views of the drawings.

DETAILED DESCRIPTION OF THE INVENTION

Figure 5A:
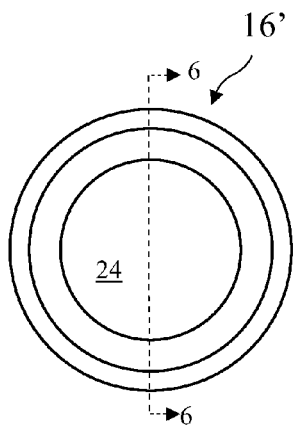
FIG. 5A is a front view of a modified wheel cap according to the present invention.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A front view of a prior art vehicle wheel 14 and tire 12 assembly 10 is shown in FIG. 1 and a cross-sectional view of a prior art vehicle wheel and tire taken assembly 10 along line 2-2 of FIG. 1 is shown in FIG. 2. The wheel 14 includes a prior art ornamental removable wheel cap 16 residing in the center of the wheel 14.

A front view of the original wheel cap 16 is shown in FIG. 3A, a rear view of the original wheel cap 16 is shown in FIG. 3B, and a cross-sectional view of the wheel cap 16 taken along line 4-4 of FIG. 3A is shown in FIG. 4. The original wheel cap 16 includes a face 18 which may include an ornamental design 22, for example, a design associated with the vehicle the wheel is used on, or a manufacturer of custom wheels. The original wheel cap 16 further includes attaching features for attaching the original wheel cap 16 to the wheel 14. The attaching features may be tabs 20 angularly spaced apart around the perimeter of the original wheel cap 16 allowing the original wheel cap 16 to snap into the wheel 14, and allowing removal of the original wheel cap 16 from the wheel 14. In some instances, the face 18 may include a passage for attaching a fixed emblem.

Figure 5B:
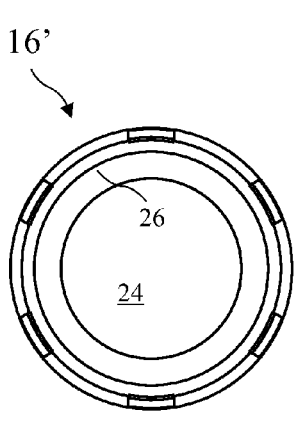
FIG. 5B is a rear view of the modified wheel cap according to the present invention.
Figure 6:
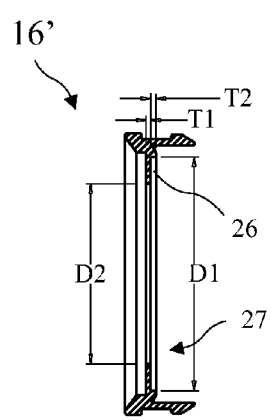
FIG. 6 is a cross-sectional view of the modified wheel cap according to the present invention taken along line 6-6 of FIG. 5A.

A front view of a modified wheel cap 16' according to the present invention is shown in FIG. 5A, a rear view of the modified wheel cap 16' is shown in FIG. 5B, and a cross-sectional view of the modified wheel cap 16' is shown in FIG. 5A, taken along line 6-6 of FIG. 5A is shown in FIG. 6. The wheel cap 16' is modified to make a passage 24 through the face 18, and to create a positioning surface 26 in the rear of the wheel cap 16'. The passage 24 has a diameter 24 of preferably about 1.87 inches and the positioning surface 26 had a diameter D2 of preferably about 2.425 inches. The positioning surface 26 has a thickness T1 of preferably about 0.050 inches and is recessed a thickness T2 of preferably about 0.050 inches. The diameters and thickness are specified for a common wheel cap 16', and other modified wheel caps may have other diameters D1 and D2 and thicknesses T1 and T2 and such variations are intended to come within the scope of the present invention.

Figure 7A:
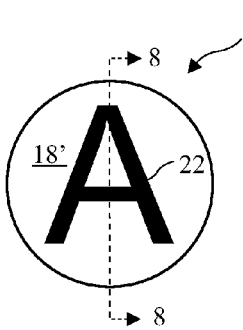
FIG. 7A is a front view of an offset weight floating cap according to the present invention.
Figure 7B:
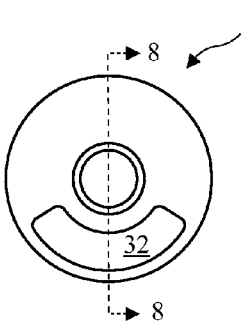
FIG. 7B is a rear view of the offset weight floating cap according to the present invention.
Figure 8:
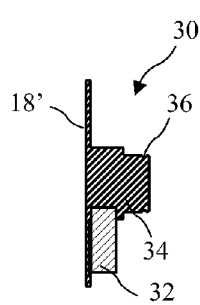
FIG. 8 is a cross-sectional view of the offset weight floating cap according to the present invention taken along line 8-8 of FIG. 7A.

A front view of an offset weight floating cap 30 according to the present invention is shown in FIG. 7A, a rear view of the offset weight floating cap 30 is shown in FIG. 7B, and a cross-sectional view of the offset weight floating cap 30 taken along line 8-8 of FIG. 7A is shown in FIG. 8. The offset weight floating cap 30 includes a face 18' which may include the ornamental design 22, or may include a feature for attachment of an emblem. A shaft 34 extends to the rear of the offset weight floating cap 30 and preferably includes a circumferential groove 36 for a ring. An offset weight 32 is fixed to the back of the offset weight floating cap 30.

Figure 8A:
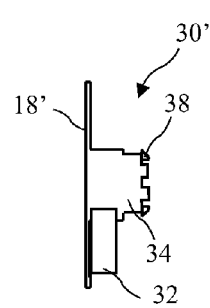
FIG. 8A is a side view of a second offset weight floating cap having tabs for retaining the second offset weight floating cap according to the present invention.

A side view of a second offset weight floating cap 30' having tabs 38 for retaining the second offset weight floating cap 30' to a fixed bearing retainer 40 (see FIGS. 9 and 10) is shown in FIG. 8A. The offset weight floating cap 30' is pressed through a bearing 46 in the fixed bearing retainer 40 squeezing the tabs 38 inward, and after passing through the bearing 46, the tabs 38 spring back to retain the offset weight floating cap 30 in the fixed bearing retainer 40.

Figure 9:
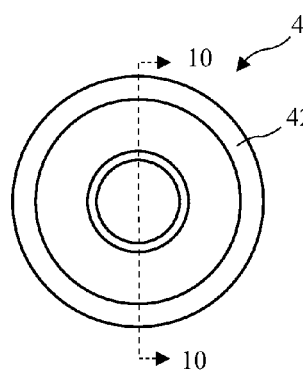
FIG. 9 is a front view of a fixed bearing retainer according to the present invention.
Figure 10:
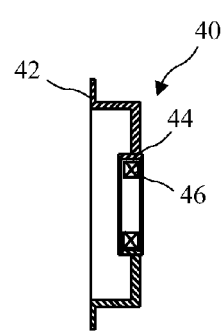
FIG. 10 is a cross-sectional view of the fixed bearing retainer according to the present invention taken along line 10-10 of FIG. 9.

A front view of a fixed bearing retainer 40 according to the present invention is shown in FIG. 9 and a cross-sectional view of the fixed bearing retainer 40 taken along line 10-10 of FIG. 9 is shown in FIG. 10. The fixed bearing retainer 40 includes an outer attaching ring 42 facing forward and a bearing seat 44 for retaining a bearing 46. The outer attaching ring 42 is shaped to facilitate positioning and attachment to the positioning surface 26.

FIG. 11 shows the elements of a floater cap assembly 60 according to the present invention and FIG. 12 shows an assembled floater cap assembly 60. The floater cap assembly 60 includes the offset weight floating cap 30, the modified wheel cap 16', the fixed bearing retainer 40, an adhesive 50, and a ring 52. The adhesive 50 is preferably double sided tape, but a floater cap assembly 60 using any form or type of adhesive to attach the fixed bearing retainer 40 to the modified wheel cap 16' is intended to come within the scope of the present invention. The ring 52 may be a snap ring, a coil spring, or any ring suitable to engage the shaft 34 to attach the offset weight floating cap 30 to the fixed bearing retainer 40 while allowing the offset weight floating cap 30 to rotate freely.

A second embodiment using a ring 52 to retain the fixed bearing retainer 40 in a second modified wheel cap 16" is shown in FIG. 13. A groove 28 is formed in the recessed area 27 in the rear of the modified wheel cap 16" and a ring 52 is positioned in the groove 28 after the fixed bearing retainer 40 is positioned into the modified wheel cap 16.

Threads 48 on an outside surface of a third fixed bearing retainer 40'' for engaging the fixed bearing retainer 40' in the modified wheel cap 16' are shown in FIG. 14. The barbs 48 engage the modified wheel cap 16' to retain the fixed bearing retainer 40'' in the modified wheel cap 16'.

Barbs 49 on an outside surface of a second fixed bearing retainer 40' for threadably engaging the fixed bearing retainer 40' in the modified wheel cap 16' are shown in FIG. 14. The threads 48 cut into the modified wheel cap 16' to retain the fixed bearing retainer 40' in the modified wheel cap 16'.

Figure 16:
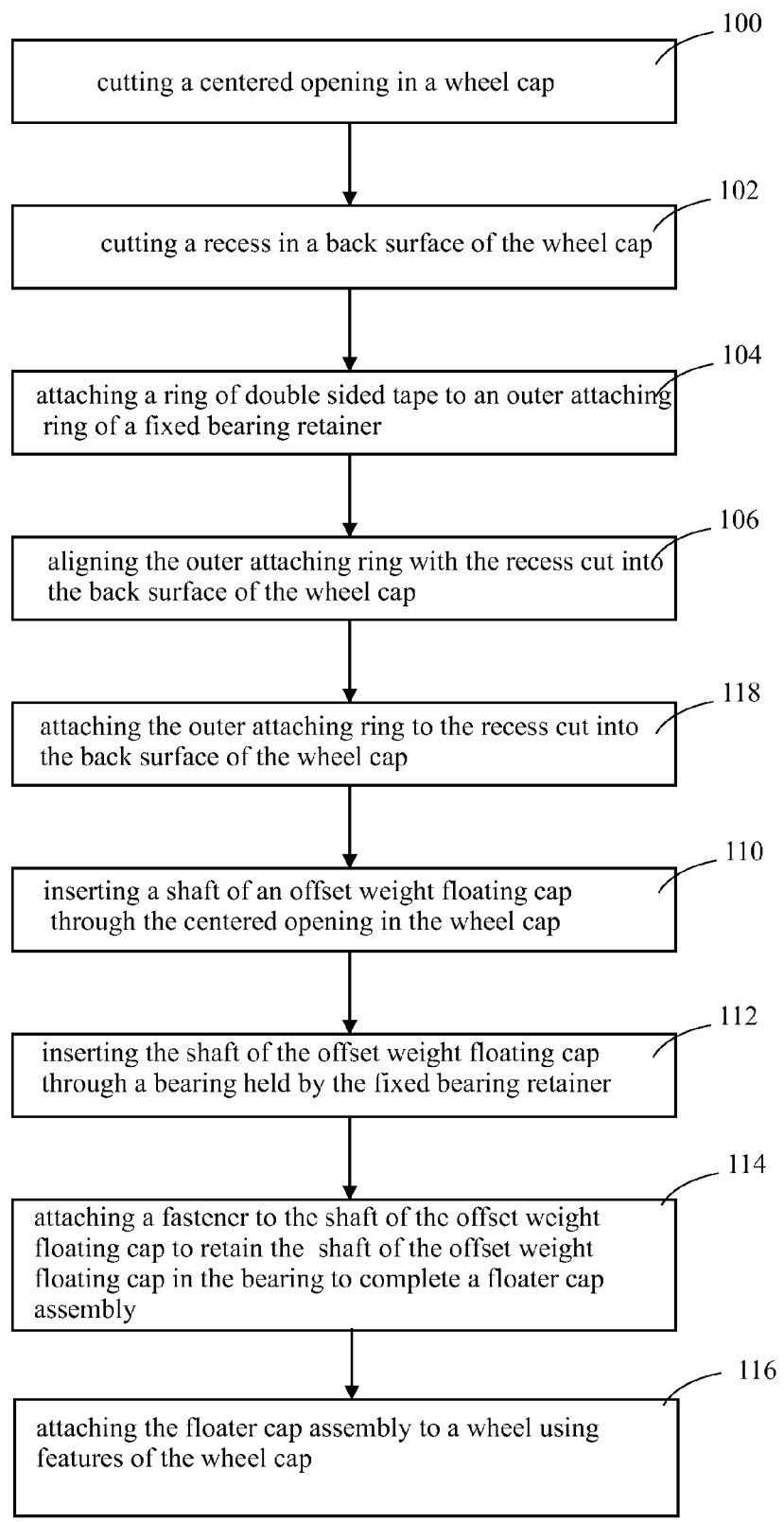
FIG. 16 shows a method for constructing the floater cap assembly according to the present invention.

FIG. 16 shows a method for constructing the floater cap assembly according to the present invention. The method includes: cutting a centered opening in a wheel cap at step 100; cutting a recess in a back surface of the wheel cap at step 102; attaching a ring of double sided tape to an outer attaching ring of a fixed bearing retainer at step 104; aligning the outer attaching ring with the recess cut into the back surface of the wheel cap at step 106; attaching the outer attaching ring to the recess cut into the back surface of the wheel cap at step 108; inserting a shaft of an offset weight floating cap through the centered opening in the wheel cap at step 110; inserting the shaft of the offset weight floating cap through a bearing held by the fixed bearing retainer at step 112; attaching a fastener to the shaft of the offset weight floating cap to retain the shaft of the offset weight floating cap in the bearing to complete a floater cap assembly at step 114; and attaching the floater cap assembly to a wheel using original features of the wheel cap at step 116.

While the invention herein disclosed has been described by means of specific embodiments and applications thereof, numerous modifications and variations could be made thereto by those skilled in the art without departing from the scope of the invention set forth in the claims.

We claim:
1. A method for constructing a floating wheel cap, the method comprising:
    obtaining an original fixed wheel cap provided with a wheel, the wheel cap having:
        a recess in a back surface of the wheel cap;
        a solid outward facing face with no openings;
        an inward extending generally cylindrical portion; and
        inward extending tabs angularly spaced apart around an outside radius of the generally cylindrical portion for attaching the wheel cap to the wheel to rotate with the wheel;
    cutting a centered opening in the face of the wheel cap;
    aligning a fixed bearing retainer with the recess in the back surface of the wheel cap;
    attaching the fixed bearing retainer to the wheel cap to reside in the recess in the back surface of the wheel cap;
    inserting a shaft of an offset weight floating cap through the centered opening in the wheel cap;
    inserting the shaft of the offset weight floating cap through a bearing held by the fixed bearing retainer;
    retaining the shaft of the offset weight floating cap in the bearing to complete a floater cap assembly; and
    attaching the floater cap assembly to a wheel using the features of the wheel cap.

2. The method of claim 1,
    further including cutting an annular recess in a back surface of the original fixed wheel cap around the edge of the centered opening.

3. The method of claim 1, wherein attaching the fixed bearing retainer to the recess cut into the back surface of the wheel cap comprises attaching an outer attaching ring of the fixed bearing retainer to the recess in the back surface of the wheel cap using adhesive.

4. The method of claim 3, wherein attaching the outer attaching ring to the recess cut into the back surface of the wheel cap comprises attaching the outer attaching ring to the recess in the back surface of the wheel cap using double sided tape.

5. The method of claim 4, wherein retaining the shaft of the offset weight floating cap in the bearing comprises attaching a fastener to the shaft of the offset weight floating cap to retain the shaft of the offset weight floating cap in the bearing to complete a floater cap assembly.

6. The method of claim 4, wherein retaining the shaft of the offset weight floating cap in the bearing to complete a floater cap assembly comprises positioning a ring in a groove exposed behind the bearing.

7. The method of claim 6, wherein retaining the shaft of the offset weight floating cap in the bearing to complete a floater cap assembly comprises positioning an outside snap ring in a groove exposed behind the bearing.

8. The method of claim 4, wherein retaining the shaft of the offset weight floating cap in the bearing to complete a floater cap assembly comprises pushing an end of the shaft including tabs through the bearing, the tabs expanding to retain the offset weight floating cap to the bearing.

9. The method of claim 1, wherein attaching the fixed bearing retainer to the recess cut into the back surface of the wheel cap comprises placing the fixed bearing retainer in the recess in the back surface of the wheel cap and positioning a retaining ring behind the fixed bearing retainer.

10. The method of claim 9, wherein the retaining ring is an inside snap ring.

11. The method of claim 1, wherein attaching the fixed bearing retainer to the recess cut into the back surface of the wheel cap comprises threading the fixed bearing retainer in the recess in the back surface of the wheel cap using threads on an outside surface of the fixed bearing retainer.

12. The method of claim 1, wherein attaching the fixed bearing retainer to the recess cut into the back surface of the wheel cap comprises engaging barbs in the recess in the back surface of the wheel cap using barbs on an outside surface of the fixed bearing retainer.

13. The method of claim 1, wherein retaining the shaft of the offset weight floating cap in the bearing comprises attaching a fastener to the shaft of the offset weight floating cap to retain the shaft of the offset weight floating cap in the bearing to complete a floater cap assembly.

14. The method of claim 13, wherein attaching a fastener to the shaft of the offset weight floating cap to retain the shaft of the offset weight floating cap in the bearing comprises positioning a ring in a groove exposed behind the bearing.

15. The method of claim 14, wherein attaching a fastener to the shaft of the offset weight floating cap to retain the shaft of the offset weight floating cap in the bearing comprises positioning an outside snap ring in a groove exposed behind the bearing.

16. The method of claim 13, wherein attaching a fastener to the shaft of the offset weight floating cap to retain the shaft of the offset weight floating cap in the bearing comprises pushing an end of the shaft including tabs through the bearing, the tabs expanding to retain the offset weight floating cap to the bearing.

17. A method for constructing a floating wheel cap, the method comprising:
  obtaining an original fixed wheel cap provided with a wheel, the wheel cap including:
    a solid outward facing face with no openings;
    an inward extending generally cylindrical portion; and
    inward extending tabs angularly spaced apart around an outside radius of the generally cylindrical portion for attaching the wheel cap to the wheel to rotate with the wheel;
  modifying the original fixed wheel cap by:
    cutting a centered opening in the original fixed wheel cap; and
    cutting an annular recess in a back surface of the original fixed wheel cap around the centered opening;
  attaching a ring of double sided tape to an outer attaching ring of a fixed bearing retainer;
  aligning the outer attaching ring with the recess cut into the back surface of the modified wheel cap;
  attaching the outer attaching ring to the recess cut into the back surface of the modified wheel cap;
  inserting a shaft of an offset weight floating cap through the centered opening in the modified wheel cap;
  inserting the shaft of the offset weight floating cap through a bearing held by the fixed bearing retainer;
  attaching a fastener to the shaft of the offset weight floating cap to retain the shaft of the offset weight floating cap in the bearing to complete a floater cap assembly; and
  attaching the floater cap assembly to a wheel using original features of the wheel cap.

18. A method for constructing a floating wheel cap, the method comprising:
  obtaining an original fixed wheel cap provided with a wheel, the wheel cap including:
    a solid outward facing face with no openings;
    an inward extending generally cylindrical portion; and
    inward extending tabs angularly spaced apart around an outside radius of the generally cylindrical portion for attaching the wheel cap to the wheel to rotate with the wheel;
  modifying the original fixed wheel cap by:
    cutting a centered opening in the original fixed wheel cap; and
    cutting a recess in a back surface of the original fixed wheel cap;
  attaching a ring of double sided tape to the recess in a back surface of the original fixed wheel cap;
  aligning the outer attaching ring with the recess cut into the back surface of the modified wheel cap;
  attaching the outer attaching ring to the double sided tape in the recess cut into the back surface of the modified wheel cap;
  inserting a shaft of an offset weight floating cap through the centered opening in the modified wheel cap;
  inserting the shaft of the offset weight floating cap through a bearing held by the fixed bearing retainer;
  attaching a fastener to the shaft of the offset weight floating cap to retain the shaft of the offset weight floating cap in the bearing to complete a floater cap assembly; and
  attaching the floater cap assembly to a wheel using original features of the wheel cap.

\* \* \* \* \*